Aug. 9, 1938.                    W. G. LAIRD                    2,126,266

METHOD OF AIR CONDITIONING

Filed Nov. 14, 1934

WILBUR G. LAIRD-*INVENTOR*

BY *Arnold R. Workman*

ATTORNEY

Patented Aug. 9, 1938

2,126,266

UNITED STATES PATENT OFFICE 2,126,266

METHOD OF AIR CONDITIONING

Wilbur G. Laird, Pleasantville, N. Y.

Application November 14, 1934, Serial No. 753,047

28 Claims. (Cl. 62—176)

This invention relates to a process for conditioning air for use in homes, office buildings, hospitals, trains, buses, factories, storage rooms and the like, or in any inclosure where controlled atmospheric conditions are desired.

Many processes have been developed and proposed for the conditioning of air for homes, vehicles, special industries, etc., but most of these systems involve mainly the feature of temperature control with little or no control of the relative humidity of the atmosphere. Other systems involve both temperature and humidity control but they are expensive to install and operate, require an excessive amount of space and are unsuited for the majority of purposes.

The more common methods of conditioning air for ordinary purposes merely involve the step of cooling the air to the desired temperature. This cooling may be effected by direct contact with water sprays or more indirectly by contact with cooled surfaces. When a cheap source of cooling water at a satisfactory temperature is not available, ice or artificial refrigeration is resorted to as a means for obtaining a satisfactory cooling effect. These processes, for the most part, involve no attempt at reducing humidity but depend upon temperature reduction and control only. The reduction of humidity to the proper percentage in processes of this type may become very expensive since a cooling medium of sub-normal temperature is required in order to condense out excess moisture, followed by re-heating to the desired temperature.

Systems which merely control temperature produce unsatisfactory conditions if the humidity is high. This is particularly noticeable where warm humid air is cooled to what is normally considered as a comfortable temperature and the relative humidity is allowed to reach or approach 100 per cent.

Under certain weather conditions, it is possible that mere control of the temperature of the air may result in a satisfactory degree of final humidity, but this is a matter of chance atmospheric conditions and is of rare occurrence in practice. In many cases it is of more importance to control the relative humidity of the air than its temperature; for example, an atmosphere approaching the saturation point or 100 per cent relative humidity often is more objectionable than would be a higher temperature with lower relative humidity.

Much is known in regard to the most favorable range of temperature and humidity for various storage rooms, manufacturing plants and processes and the like, and various investigations have been made in an effort to determine a so-called "curve of comfort" or "comfort zone" which will serve to indicate the temperature-humidity relationship which will provide the greatest comfort to the average human being under average conditions of working and living. In the 12th edition (1934) of the "Heating and Ventilating Engineers Guide", chapter 2, one such "comfort zone" chart is shown and described. This chart which has wide acceptance, shows two overlapping "comfort zones", one for winter conditions and one for summer conditions. The temperature range covering both zones ranges from 63° to 75° F. and the relative humidity ranges from 30% to 70%. By taking a rough mean of the temperature-humidity relationship of that portion of the zones common to both winter and summer conditions, it will be found that this mean may be expressed approximately as 68.5° F. and 50% relative humidity. This relative humidity may be expressed as approximately 0.0075 pound of moisture per pound of dry air, and the 100 per cent saturation or dew-point temperature for this proportion of moisture would be approximately 50° F.

From the foregoing, it will be obvious that no mere spraying with water at ordinary temperatures or cooling by refrigeration to a normal degree will provide sufficient treatment to produce a satisfactorily conditioned air for human health and comfort. Atmospheric air carrying more or less than 0.0075 lb. of moisture per lb. of dry air will require cooling to approximately 50° F. (at which temperature it is saturated with that amount of moisture), before it will have dropped its excess moisture, or absorbed, with accuracy, its deficiency in moisture. Various industrial processes require accurate humidity control (A. S. H. V. E. "Guide", chapter 3), which cannot be secured in many cases without cooling the air supply to very low temperatures, with elaborate refrigeration.

Quite aside from the matter of temperature-humidity relationship, many conditions arise wherein air cleanliness and freedom from living bacteria are required. Ordinary air conditioning methods employ water sprays and various filtering devices, the latter being mostly in the form of units containing mineral wool, metal wool or some fibrous material that may be wetted or oiled and through which the air is passed for the purpose of trapping and holding entrained dust particles. In some cases these filter units are inexpensive and are used only until they are no longer serviceable and then are discarded and replaced by new units.

Obviously, these simple methods of spraying the air with water or passing it through thin bodies of fibrous material, while capable of removing many of the larger dust particles, are unsuited to the removal of the finer or microscopic dust particles and have little or no effect in the removal of the finer vegetable pollens, yeast and mold cells, bacteria and the like and which are objectionable in many instances. Many living organisms including bacteria are not filterable under the conditions imposed upon commercial air conditioning equipment and therefore they must be destroyed in their entrained state if the air is to be freed of their contamination.

Therefore the primary object of the present invention is to provide a process for completely conditioning air which definitely assures a predetermined atmosphere freed of germs and bacteria and at the same time avoids the great expense and many difficulties involved in present practice.

Another object of the invention is to provide a process for conditioning air in which the desired humidity is definitely obtained and controlled without the use of expensive refrigerating equipment.

A further object is to provide an air conditioning process in which the humidity of the air is accurately regulated and controlled automatically without resort to the use of wet and dry bulb thermometry.

In accordance with these and other objects and advantages of the invention the improved process in its preferred form comprises the steps of precooling the air to be conditioned, compressing it to a super-atmospheric pressure, cooling the air while under pressure to a substantially ordinary temperature, saturating the air at said temperature and pressure, maintaining a predetermined relationship between the pressure and the minimum temperature attained by the air while under pressure, releasing the pressure on the air and conducting it to the point of use, with or without added heat.

Other features of the invention will be apparent from the following more detailed description taken in connection with the accompanying drawing which forms a part of this application. Referring to the drawing.

In the different figures of the drawing the same or corresponding elements of the apparatus are designated by the same reference numerals.

Under differing climatic conditions certain variations may conveniently be made in the conditioning apparatus used, since one may deal primarily with a hot humid air in one section while a hot dry air must be handled in another. If the air is to be conditioned in winter then it may be cold and either humid or dry, or it may be about right as to temperature but either too humid or too dry.

Figure 1:
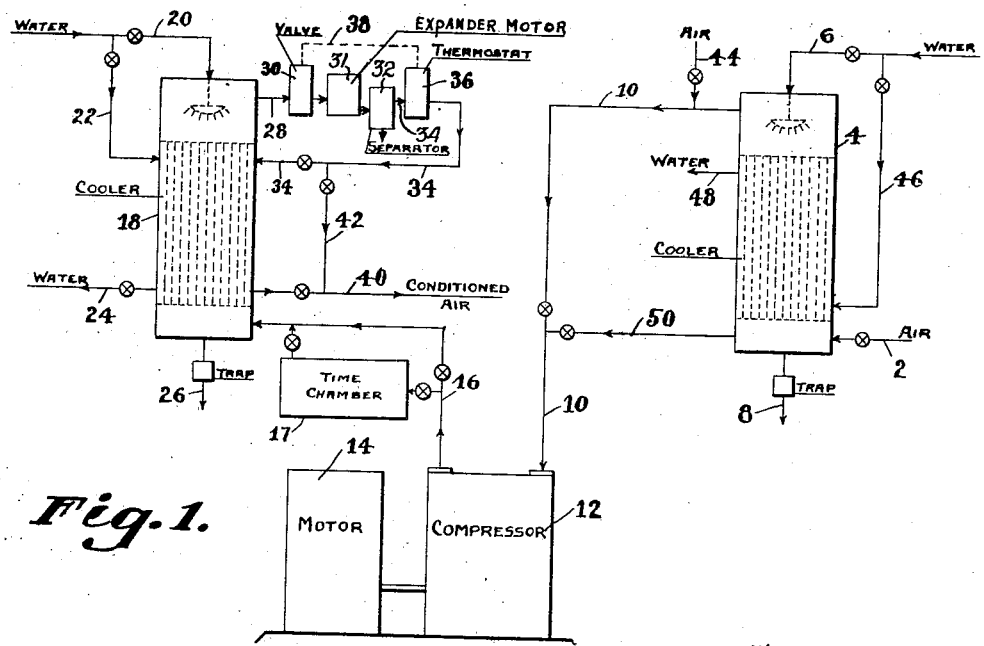
Fig. 1 is a diagrammatic illustration of a form of apparatus adapted to carry out the improved process.

As an illustration of one method of operation of the apparatus shown diagrammatically in Fig. 1, it will be assumed that a hot humid air is to be conditioned. Atmospheric air is introduced through a valved line 2 into the lower portion of a cooling tower 4. The entering air passes up through the tower 4 in contact with water sprayed into the top of the tower from a valved water supply line 6, which is connected to an ordinary source of water supply, or the water may be supplied from a spray pond or cooler. The hot humid air in the contact tower is cooled to approximately the temperature of the water entering the tower and a part of its moisture is condensed. The used water and condensate is withdrawn from the tower 4 through a line 8 which may be provided with a trap, and then sent to a spray pond, cooler, or to waste.

The air is withdrawn from the tower 4 through a valved line 10 into a compressor 12 in which the air is placed under a suitable superatmospheric pressure. The compressor may be driven by any suitable motor 14. The air, which is heated by the compression is then cooled while under pressure by passing it through a line 16 into a pressure cooling tower 18 which may comprise a construction similar to that of tower 4. In many cases it is important that the conditioned air be sterilized. Therefore in order to maintain the air at the temperature at which it leaves compressor 14 over an increased time period, it is passed into and through an insulated time chamber 17 which is connected into the line 16 by suitable valved conduits as shown. If in any particular circumstance the temperature of the compressed air is not as high as necessary, such as when a very low pressure is required for conditioning, the air in chamber 17 may be heated by outside means to the desired temperature. After sterilization of the air in chamber 17, it is conducted into the tower 18.

Water from the usual supply or from a spray pond or the like is sprayed into the tower 18 through a valved water supply line 20 and brought in direct contact with the air. The air under pressure passing through the tower 18 is cooled to approximately the temperature of the water supplied and a further portion of its moisture is condensed by the spray water. Used water and condensate are withdrawn from tower 18 through a line 26 in which a trap may be installed as shown.

The cooled air reaching the top of the tower 18 is saturated with water vapor at its attained temperature under the compression pressure. Since both the temperature and pressure are known (by measurement) the moisture content of the air is also known (or may be calculated from known data). The moisture content of the air therefore can be adjusted by controlling the temperature-pressure relationship of the air withdrawn from the tower 18. Ordinarily, the temperature of the air leaving the tower will remain reasonably constant with any constant source of cooling water supply and it will be the pressure to which the air is compressed that, to a large extent, must be controlled and which will govern the actual moisture content in pounds per pound of dry air. The air containing its adjusted moisture content is discharged from the tower 18 through a line 28 in which is mounted a thermostatically controlled pressure reducing or throttle valve 30. The air after passing through the valve 30 is at substantially atmospheric pressure and may be conducted to the point of use either before or after being employed in cooling the hot air from the compressor as hereinafter described in connection with a modified form of operation.

In accordance with this modified form of operation the moisture content of the air being conditioned may be only partly reduced or adjusted in the tower 18 so that it may be adjusted further after leaving the tower by utilizing the pressure drop to cause a drop in temperature which in turn will condense additional moisture. In accordance with this latter procedure the air is withdrawn from tower 18 through the line 28 in which is mounted the thermostatically controlled pressure reducing or relief valve 30. The air is discharged from the valve 30 through an expander motor 31, which may be similar to that shown and described in connection with Fig. 2, and then passed at approximately atmospheric pressure into a separator 32. The reduction in pressure on the air passing through the expander motor 31 causes a very substantial expansion and consequent cooling of the air which results in a further condensation of its moisture content. The water condensate is removed from the air stream by means of separator 32 which may be constructed in any suitable manner.

The cooled air is discharged from the separator 32 through a line 34 in which is mounted a thermostat or other temperature responsive device 36 for taking the temperature of the air as it leaves the separator 32. The thermostat 36 is operatively connected (as indicated diagrammatically by dotted line 38) to operate the pressure control valve 30.

The expansion of the air leaving valve 30 in the expander motor 31 to atmospheric pressure will result in a cooling effect which will be a constant under the same conditions of temperature-pressure relationship before expansion. Therefore the temperature to which the air is cooled by expansion to substantially atmospheric pressure, as determined by the thermostat 36, will depend upon the temperature-pressure relationship of the air before passing the valve 30. Since the temperature of the compressed air leaving the tower 18 will be substantially constant with a constant source of cooling water supply, any desired temperature of the air in separator 32 and passing thermostat 36, may be maintained by controlling the back pressure maintained by valve 30. The thermostat 36 is adapted to provide this pressure control automatically by respectively increasing or decreasing the pressure maintained by the relief valve 30 as the temperature of the expanded air rises above or falls below the temperature desired in separator 32. The choice of the temperature of the expanded air in or leaving separator 32 fixes the moisture content of the air in accordance with its moisture carrying capacity or saturation point at that temperature and pressure (the pressure in this case being substantially atmospheric or the barometric pressure at the time and place).

The air discharged through the line 34 in the latter operation will be saturated at its expanded temperature and will contain the desired amount of moisture per pound of dry air, but for certain purposes, as for home or office use, and many processes, the air will be too cool. The cool air, however, may be heated to the desired temperature by any desired outside means, or it may be heated and its cooling effect efficiently utilized by passing all or any portion of it in heat exchange with the heated compressed air leaving the compressor 12 (or chamber 17 when it is in use). Means for heating the expanded air and cooling the compressed air is shown in connection with tower 18 in which the cool expanded air or any portion thereof may be sent through line 34 into the space surrounding the tubes in tower 18, passed counter current to the heated air passing through the tubes, and removed through line 40 for use. A by-pass line 42 permits all or any portion of the cool air to by-pass the heat exchange surface in the tower 18. A heat exchanger separate from 18 may be placed in line 16 or if desired, the cold expanded air may be used for precooling the air entering the compressor by inserting an interchanger in line 10.

In carrying out the process to provide conditioned air of any predetermined moisture content it is necessary to obtain a temperature immediately after expansion (in separator 32) at which all moisture in excess of the predetermined amount will be condensed before the air has passed the separator 32. In selecting the temperature in separator 32 the absolute pressure therein or the barometric pressure must be taken into account in order to secure extremely accurate results.

With the foregoing method of operation, it will be obvious that the pressure to which the air is compressed will depend upon the temperature to which it is cooled before release and expansion and that this temperature will depend in turn upon the temperature and quantity of the cooling water used in the tower 18. Since the compressed air is saturated at the pressure and temperature obtaining immediately prior to its release and expansion from valve 30 and the expander motor 31, the pressure differential between the compression pressure and the expanded pressure must be sufficient to provide the cooling effect necessary to cool the air-vapor mixture and take up the latent heat of condensation of the excess water vapor. The back pressure necessary for any given set of conditions is readily obtained by the automatic controls which are calibrated from known data relating to the thermodynamics of saturated air.

The proper temperature-pressure relationship of the air before expansion may be maintained by the thermostatic control of the valve 30 as shown, or, the thermostat may be placed on the pressure side of the valve 30 if desired. The important function of the thermostat 36 is to increase or decrease, respectively, the compression pressure on the air as its temperature at the thermostat increases or decreases, in order that a suitable temperature-pressure relationship may be maintained. The expanded air pressure may be any desired pressure below that maintained in the tower 18 by the valve 30.

If a hot dry air is to be conditioned with the apparatus shown in Fig. 1 the water spray in tower 4 is not used because moisture would be added to the air, which preferably receives its necessary moisture in tower 18. However, the hot dry air is cooled in tower 4 by closing the valve in line 10 and introducing the air through a valve controlled line 44 into line 10 and passing it downwardly through the heat exchange section of tower 4 in indirect heat exchange with water introduced from line 6 through a valve controlled line 46. Waste water is discharged through a line 48. The cooled air reaching the bottom of tower 4 is conducted through a valved line 50 and a portion of the line 10 into the compressor 12.

The cooling tower 4 need not be used for the treatment of cold air whether humid or dry, but the air may be passed directly to the compressor through lines 44 and 10 with the valve in the line 50 closed.

If, for any reason, it is not desirable to have the air leaving the compressor and entering tower 18 come in direct contact with water, then the valve in water line 20 may be closed and the valve in line 22 opened with the used water passing out through valved line 24. With this method of indirect heat transfer between the water and the air passing through the tower, the expanded air is passed through lines 34 and 42 to line 40 unless other heat transfer surface is provided in line 16 or in some other suitable manner as will be readily understood but which it is believed unnecessary specifically to show in the diagrammatic showing.

Figure 2:
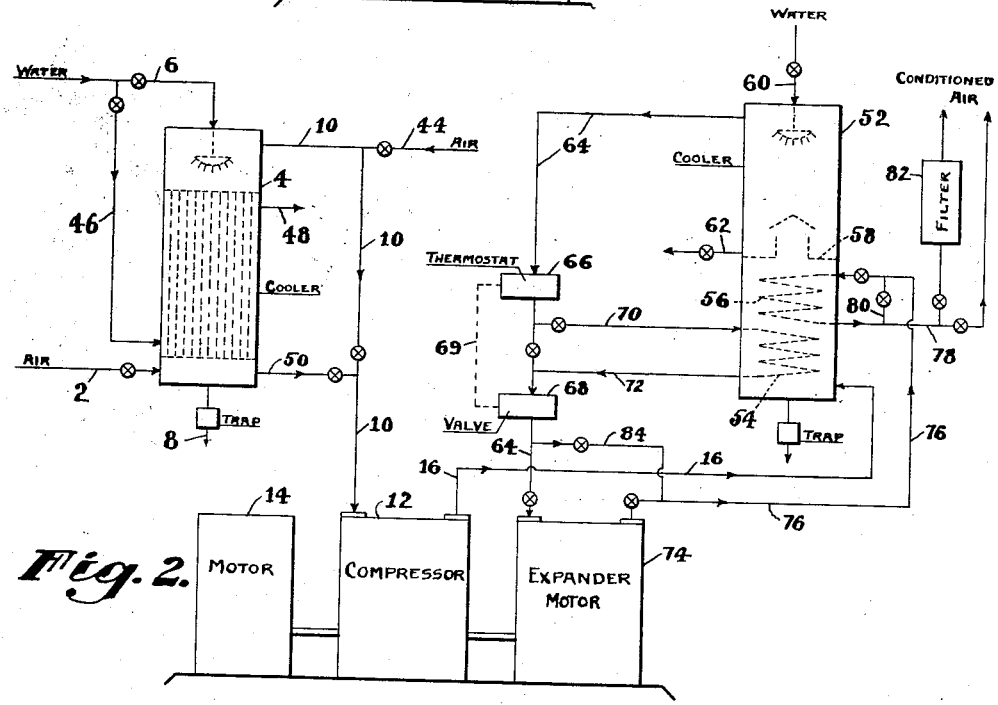
Fig. 2 is a diagrammatic illustration of a modified form of apparatus more particularly adapted for carrying out a modified form of the improved process.

The air to be conditioned in the apparatus shown in Fig. 2 of the drawing receives the same preliminary treatment as the air treated in the apparatus of Fig. 1, up to and including compression in compressor 12. This includes the various types of air referred to in connection with Fig. 1.

According to the showing in Fig. 2, the air discharged under a substantial superatmospheric pressure from compressor 12 through line 16, is passed through a chamber like 17, Fig. 1, if desired, and introduced into the lower portion of a cooling tower 52 where it passes in indirect heat exchange with cool air passing through coils 54 and 56. The partially cooled compressed air then passes through a tray partition 58 into the upper spray chamber portion of the tower 52' where it is cooled by direct contact with water introduced from a supply line 60. The used water and condensate collect on the tray 58 and are withdrawn through a valve controlled line 62. The air under pressure which has been cooled to approximately the temperature of the water supply is discharged from the tower 52 through a line 64 in which is a thermostat or temperature operative device 66 and a pressure control or throttle valve 68. The thermostat 66 is operatively connected to the valve 68 as indicated by a dotted line 69.

The pressure and temperature of the air in tower 52 definitely determine the moisture content of the air discharged through line 64. If the air is maintained at constant temperature there is a definite moisture content for every pressure (the higher the pressure the lower the moisture content per pound of dry air) and if the pressure is also constant the moisture content remains fixed. Since a fixed moisture content per pound of dry air is usually desired the back pressure maintained by valve 68 is controlled and regulated by the thermostat 66 in accordance with the air temperature leaving tower 52. The higher the temperature the higher the pressure must be in order to give air having a fixed predetermined moisture content.

The absolute pressure necessary to give the desired moisture content at any given temperature may be determined from the equation given by Walker, Lewis and McAdams, in "Principles of Chemical Engineering" 1923, page 443. The equation is:

$$H = \frac{(p)(18.02)}{(P-p)(29)}$$

In this equation:
H = humidity in pounds of water vapor per pound of dry air.
P = the absolute pressure.
p = the actual partial pressure of water vapor at the temperature (from steam tables).

To obtain the absolute pressure required for a given humidity the equation is merely solved for P, the absolute pressure, and the desired value for H, and the steam table value for p substituted.

The air after passing the thermostat 66 and before reaching the valve 68 in line 64 is preferably passed wholly or in part through a valved line 70 into coil 54 and back through a line 72 into the line 64 before the by-pass valve therein, after which the air may be utilized for the production of mechanical energy by passing it through the back pressure or throttle valve 68 and line 64 into an expander 74 which is connected to the compressor 12 by a drive shaft as shown. Any other use may be made of the power from expander 74 than to help compress the air. The expanded air, cooled by the expansion, is discharged from the expander 74 through a line 76 and all or any desired part thereof passed through coil 56 in tower 52. The conditioned air is passed from coil 56 through a line 78 to any desired point of use. The temperature to which the air in line 78 is heated in coil 56 may be accurately controlled by the use of a by-pass 80 between lines 76 and 78, together with suitable valves as shown. If necessary or desirable the conditioned air in line 78 may be passed through a filter 82 by means of the lines and valves as shown. The filter 82 may be placed in a pressure part of the circuit if desired.

In carrying out the process as shown and described with apparatus of the type of Fig. 2 the amount of moisture in the finished air is fixed in tower 52', and the subsequent steps of the process should be effected in such a manner that the temperature of the compressed air discharged from tower 52 at no time falls below that indicated by the thermostat 66. Since somewhat higher pressures are required with the apparatus of Fig. 2 than with that of Fig. 1 the cooling of the air on expansion would be greater. It is therefore necessary that the air discharged from the tower 52 be heated prior to its expansion, as by coil 54 or other heater, and the preheating should be sufficient to insure a temperature after expansion high enough to avoid condensation of moisture.

If expander 74 is an ordinary reciprocating type of engine, then higher efficiency may be obtained by thermostatic control of the valve "cut-off" instead of the simple throttle control shown, as will be obvious to those familiar with steam or air engine governors.

The expander 74 is merely one example of a means for using the energy in the compressed air. Any form of expander may be used and its power shaft may be connected to the compressor 12 by any suitable means or the power generated may be used in any other way. The mechanical energy in the compressed air may be wasted if desired and its cooling effect employed in the apparatus of Fig. 2 by eliminating the expander 74 and passing the heated air from coil 54 and valve 68 through valved by-pass line 84 direct to the coil 56 or to use. The lower the temperature to which the air is cooled in tower 52 the lower the pressure to which it must be compressed in order to obtain the desired moisture content.

The method of operation described in connection with Fig. 2 is the preferred method. However, it will be obvious that the method of moisture elimination by expansion-cooling described in connection with Fig. 1 may be applied to the operation of the process of Fig. 2 by allowing the compressed air from line 64 to enter the expander without preheating and to expand therein. With this method of operation the expansion of the air causes cooling and condensation of the excess moisture in the air. The condensate is then removed from contact with the expanded air before it becomes heated. With this method of operation, the pressure to which the air is compressed is substantially the same as that required in connection with the operation of the process shown by Fig. 1. Similarly, the operation of the process as described in connection with Fig. 1 may be arranged with an expander in line 34 after valve 30 and before the separator 32.

The air conditioning process as described in connection with both Fig. 1 and Fig. 2 is particularly efficient in the cleansing of the air during its treatment. The air not only is washed before compression (as described in connection with the towers 4) but is sterilized and again washed while under compression, at which time its volume is reduced correspondingly and such suspended matter as it may contain is concentrated in a smaller space. Dust particles, vegetable pollen and the like become not only more concentrated in the compressed atmosphere, but the high humidity together with the compression insures a high moisture content in the particle itself which aids in its removal. Furthermore, the air may be filtered in either the high or low pressure phases, or in both.

It will be understood that the thermostats shown and described in connection with both Fig. 1 and Fig. 2 are for the purpose of automatic control. In some cases, however, where no great accuracy of moisture content in the air is required or when the temperature of the cooling water is substantially constant over reasonable periods of time, the automatic control may be dispensed with and the thermostatically operated throttle or back pressure valves described may be replaced by ordinary relief valves which may be manually adjusted to provide the desired back pressure from time to time as required.

It is preferred that all of the conditioned air be passed through the cycle described, but under certain conditions it may be desirable to pass only a portion of the air through the conditioning cycle and to mix the treated air with untreated or partially treated air to obtain a satisfactory mixture at a lower cost of treatment and with reduced investment in equipment.

Under certain conditions it may be economically wise to use relatively high pressures and relatively small amounts of cooling water for spraying in the towers 18 and 52, as for example, where water is scarce or expensive and power is relatively cheap, or in cases where a germicide is used in the spray water. Where clean water is plentiful and inexpensive in comparison with the cost of power, sufficient water may be used to cool the air in towers 18 and 52 to substantially the water temperature. The phrase "ordinary temperature" or similar phrases used in connection with the temperature of the direct or indirect cooling water employed for cooling the air after compression is defined as any temperature above that at which the air is saturated at atmospheric pressure with the desired proportion of water vapor. The cooling water supplied for any step may be further cooled to some extent by heat exchange with the cooled expanded air produced in the process, as the economics of the situation may dictate.

Some of the advantages of the process of the present invention lie in its flexibility and its adaptability to conditions where the normal water supply cannot be used without the air of refrigeration. Furthermore the moisture content of the conditioned air may be accurately and automatically controlled without the use of complicated humidity indicating devices such as those which depend upon "wet" and "dry" bulb thermometry.

The conditioned air produced by this process has particular value in cases where a sterilized atmosphere is desirable, as in hospitals, food processing, storing and handling, fermentation processes, etc. The compression of air raises its temperature sufficient to destroy bacteria (in chamber 17). Furthermore, aside from temperature effect the sudden expansion of the air after compression is also destructive of bacteria.

In conditioning air for dwellings, special processes, trains and other conveyances, two general conditions must be met; a dry air which must be humidified and a humid atmosphere which must be dried. The process of the present invention automatically produces the desired humidity regardless of what the humidity of the air happens to be so long as the water contact cooling tower is in the system. Water contact is unnecessary however, when the air must be dehumidified except that it is a very effective and economical method for cooling the air. When conditions permit, the equipment may include air cooled heat exchangers for cooling the air from the compressor and only enough water used to humidify the air being treated (when necessary). Air cooling is particularly advantageous for trains and other vehicles.

It is to be understood that the process of conditioning air described herein may be carried out in apparatus other than that shown in the drawing without departing from the spirit and scope of the present invention. Various modifications may also be made in the process to adapt it to particular circumstances and it is also understood that the process of the invention is not to be limited except by the following claims.

Having thus described the invention in its preferred form what is claimed as new is:

1. The process of conditioning air, which comprises compressing the air to be conditioned, passing the air at a superatmospheric pressure through a cooling zone in indirect heat exchange with relatively cool air produced in the process, passing the air from said zone into a contact zone in contact with water of ordinary temperature, maintaining the pressure in said contact zone in relation to the temperature of the air leaving said zone such that the air is saturated with the amount of moisture desired in the conditioned air, passing the air from said contact zone through said cooling zone to heat the air and then through an expansion zone in which mechanical energy is developed by the expanding air, utilizing said energy in the compression of the air, and passing the air from the expansion zone in indirect heat exchange with the air being conditioned.

2. The process for conditioning air, which comprises contacting the air to be treated with water at ordinary temperature and then compressing the air, cooling the compressed air by passing it in indirect heat exchange with relatively cooled air and then in direct contact with water of ordinary temperature, maintaining a pressure on the air in the latter contact sufficient to give a saturated air at its temperature leaving said latter contacting stage which contains the desired amount of moisture in pounds of moisture per pound of dry air, passing the resulting air in said indirect heat exchange, reducing the pressure thereon, and conducting the same to the point of use.

3. The process of conditioning air, which comprises compressing the air to be conditioned, cooling the compressed air to approximately the temperature of ordinary cooling water, controlling the pressure maintained on the cooled air in accordance with its temperature so as to produce a saturated air at the said temperature which contains the proportion of moisture desired in the conditioned air, reducing the pressure on the air and conducting it to the point of use.

4. The process defined by claim 3 in which said cooling step includes the contact of the air with water.

5. The process defined by claim 3 in which said cooling step includes the indirect heat exchange of the compressed air with the cooled air.

6. The process defined by claim 3 in which the pressure maintained on the compressed air is automatically controlled in accordance with the air temperature after the cooling step.

7. The process defined by claim 3 in which the pressure maintained on the compressed air is controlled automatically in accordance with the relationship of the temperature and pressure of the air after the cooling step.

8. The process defined by claim 3 in which the pressure maintained on the compressed air is controlled automatically in accordance with the proportion of moisture in the air after the cooling step.

9. The process of conditioning air, which comprises compressing the air to be conditioned, cooling the compressed air and contacting it with water of the temperature of the available water supply, maintaining the air during said contacting at a controlled pressure in accordance with its temperature after said contact, which at the temperature of the cooled air, is such as to provide air having a predetermined moisture content, reducing the pressure on the resulting air and conducting it to the point of use.

10. The process defined by claim 9 in which the energy available in reducing the pressure on the air is utilized to aid in compressing the air being processed.

11. The process of conditioning air for the purpose of producing a sterilized air having a predetermined temperature and humidity, which comprises compressing the air to be conditioned to a substantial superatmospheric pressure, cooling the compressed air, said cooling including the step of passing the compressed air in intimate contact with water having a temperature above the dew point temperature at atmospheric pressure of the final conditioned air, maintaining a pressure on said air during and directly after said water contact, in accordance with the temperature of the air directly after said contact and which will secure said predetermined humidity of the air, reducing the pressure on the resulting air to approximately atmospheric, and bringing the air to the said predetermined temperature.

12. The process defined by claim 11 in which the pressure maintained on the air is regulated in accordance with a predetermined temperature-pressure relationship.

13. The process of conditioning air, which comprises compressing atmospheric air to a superatmospheric pressure, cooling the air and contacting it with water while under pressure thereby saturating the air at said pressure and resulting water contact temperature, releasing the pressure on the air and conducting it to the point of use, and so regulating the pressure maintained on the cooled air that the air supplied for use contains a predetermined weight ratio of moisture to dry air.

14. The process of producing a conditioned air having a predetermined dew point at atmospheric pressure, which comprises compressing the air to be conditioned to a substantial superatmospheric pressure, contacting the compressed air with water having a temperature substantially above that of said dew point thereby saturating the air at the compression pressure, expanding the cooled air to a predetermined lower pressure under conditions adapted to effect further cooling of the air to the temperature at which it contains the requisite proportion of moisture to give said dew point.

15. The process of conditioning air as defined by claim 14, in which the compression pressure is controlled and varied in accordance with the temperature range through which the air must be cooled after the water contact.

16. The process of conditioning air, which comprises compressing the air to be conditioned, thereafter cooling the air under pressure by passing it in direct contact with water at its available temperature, expanding the resulting cooled and compressed air to substantially atmospheric pressure and conducting it to the point of use, and controlling the pressure to which the air is compressed in accordance with the temperature of the air immediately after being cooled by said water, thereby regulating the proportion of moisture left in the air by the water contact.

17. The process of conditioning air for trains, buses and other vehicles, which comprises compressing the air and thereby placing it under a substantial superatmospheric pressure, cooling and contacting the air with water while under said pressure thereby saturating the air at said pressure, releasing the pressure on the air and conducting it to the point of use, and controlling the pressure to which the air is compressed in accordance with the temperature to which the air is cooled after compression so that the air contains a predetermined proportion of moisture at the said temperature.

18. The process for conditioning air for dwellings, conveyances, public buildings and special processes, which comprises compressing the air to be conditioned and cooling it by contact with water of ordinary temperature to about the temperature of the water, expanding the air to approximately atmospheric pressure under conditions adapted to effect further cooling of the air to a predetermined temperature, varying the pressure to which the air is compressed in accordance with any variations in the temperature of the air directly following the water contact, the pressure on the air being sufficient to cool the air on expansion from the last named temperature to said predetermined temperature.

19. The process for conditioning air for dwellings, conveyances, public buildings and special processes, which comprises compressing the air to be conditioned and cooling it by contact with water supplied at its available temperature, expanding the air under conditions adapted to effect its cooling to a temperature at which the resulting air is saturated with the proportion of moisture desired in the conditioned air, automatically varying the pressure on the air in accordance with the degree of expansion necessary to give the desired moisture content, reheating the air after said expansion to the desired final temperature, and conducting the conditioned air to the point of use.

20. The process defined by claim 19 in which the air is cooled prior to compression and in which the cool expanded air is passed in indirect heat exchange with the compressed air immediately after compression.

21. The process of conditioning air for dwellings, conveyances, public buildings and special processes, which comprises compressing the air to be conditioned, thereafter cooling the compressed air by passing it in indirect heat exchange with relatively cool air produced by the process, expanding the resulting cooled and compressed air to substantially atmospheric pressure under conditions adapted to effect further cooling of the air to a predetermined relatively low temperature, controlling the pressure to which the air is compressed in accordance with the temperature of the air immediately prior to said expansion, and passing the cooled expanded air in indirect heat exchange with the compressed air.

22. The process of conditioning air for vehicles where the air contains excess moisture, which comprises compressing the air to a substantial superatmospheric pressure, cooling the compressed air to approximately normal atmospheric temperature while under said pressure to remove a portion only of said excess moisture, further cooling the air to a predetermined temperature which is sufficiently low to condense out the remaining excess of moisture at approximately atmospheric pressure by expanding the air to approximately atmospheric pressure under conditions adapted to effect said further cooling, and increasing or decreasing respectively the pressure imposed on said air as the temperature of the air prior to said expansion increases or decreases.

23. The process of conditioning air, which comprises compressing the air to be conditioned, cooling the compressed air to approximately the temperature of ordinary cooling water, controlling the pressure maintained on the cooled air in accordance with its temperature so as to produce a saturated air at the said temperature which contains the proportion of moisture desired in conditioned air, heating the compressed air following said water contact by passing it in heat exchange with relatively hot air leaving the compressor, and again cooling the air by expanding it under conditions adapted to effect cooling thereof.

24. The process of conditioning relatively moist air, which comprises compressing the air to be conditioned, thereafter cooling the air under pressure to approximately atmospheric temperature, expanding the resulting cooled air to approximately atmospheric pressure and conducting it to the point of use, and controlling the pressure to which the air is compressed in accordance with the temperature of the air after being cooled and prior to its expansion thereby regulating the proportion of moisture left in the air.

25. The process of conditioning air, which comprises compressing the air to be conditioned, cooling the compressed air to approximately the temperature of ordinary cooling water, controlling the pressure maintained on the cooled air in accordance with its temperature so as to produce a saturated air at the said temperature which contains the proportion of moisture desired in the conditioned air, heating the resulting air by indirect heat exchange with relatively hot compressed air, and thereafter expanding said resulting air under conditions adapted to effect cooling thereof.

26. The process of conditioning air, which comprises compressing the air to be conditioned to a superatmospheric pressure regulated in accordance with the temperature of the air at a later stage of the process, cooling the compressed air, expanding the resulting cooled and compressed air to a desired lower pressure approximating atmospheric pressure under conditions adapted to effect substantial further cooling of the air to a predetermined relatively low temperature, and passing at least a portion of the resulting cooled expanded air in indirect heat exchange with the compressed air to effect at least a part of said cooling.

27. The process defined by claim 26 in which said first mentioned cooling is in part effected by passing the compressed air in heat exchange with water.

28. The process of conditioning air containing excess moisture to produce air having a desired humidity, which comprises compressing the air to be conditioned to a substantial superatmospheric pressure, cooling the compressed air while under pressure, expanding the resulting cooled air under conditions adapted to effect cooling of the air to a temperature which is sufficiently low to condense the excess moisture and thereby produce air having said desired humidity, and controlling the pressure imposed on the air being compressed in accordance with the temperature of the air after expansion.

WILBUR G. LAIRD.